Figure 1:
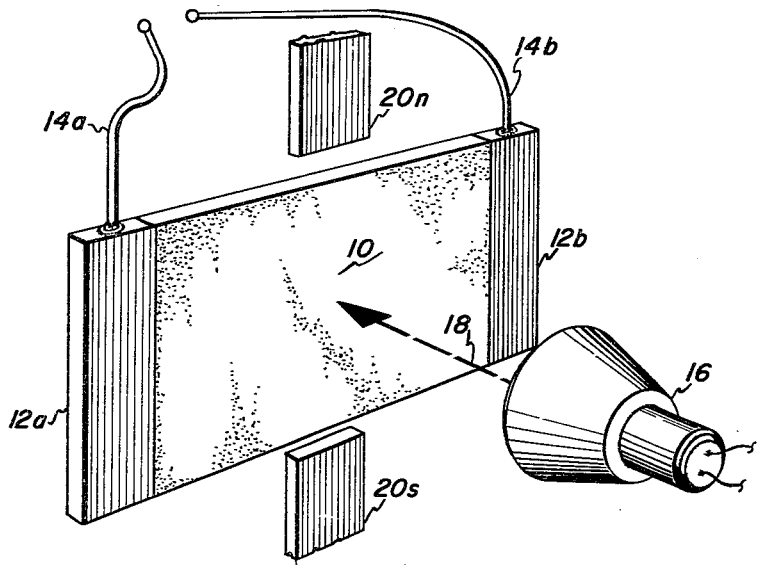

July 23, 1963

J. T. SMITH 3,098,998

MAGNETIC TRANSDUCER

Filed June 30, 1958

2 Sheets-Sheet 1

INVENTOR.
JAMES T. SMITH
BY

INVENTOR.
JAMES T. SMITH

United States Patent Office 3,098,998
Patented July 23, 1963

3,098,998
MAGNETIC TRANSDUCER
James T. Smith, San Jose, Calif., assignor to International Business Machines Corporation, New York, N.Y., a corporation of New York
Filed June 30, 1958, Ser. No. 745,533
1 Claim. (Cl. 340—174.1)

The present invention relates to the devices for sensing and recovering magnetically recorded data that are known as magnetic transducers. More particularly the present invention relates to magnetic transducers of the type that utilize the deflecting effect of magnetic fields upon electric currents. Specifically the present invention relates to magnetic transducers, of the type referred to, wherein an electrically unbalanced semi-conductor is exposed to the magnetic fields emanating from magnetized areas to produce a current flow in said semi-conductor in a direction at right angles to the magnetic fields, which current flow varies in accordance with variations in the strength and location of said fields.

The desirable characteristics of a magnetic transducers are (1) high resolution, i.e., the ability to discriminate between and respond individually to every one of a sequence of narrowly spaced spots of magnetically recorded information so that a maximum number of data may be stored magnetically in a minimum space with the assurance that each datum may be fully and clearly recovered by the transducer whenever desired. In addition, a magnetic transducer should be (2) flexible, i.e., it should lend itself to scanning a large area with a minimum of effort, and last but not least (3) the voltage response produced in the transducer to changes in the location and intensity of the minute magnetic fields emanating from the areas of a magnetizable surface upon which information has been magnetically stored should be as large as possible so that it may readily be converted into distinct signals with a minimum of amplification.

Devices that employ the ability of magnetic fields to deflect current passing through a semi-conductor such as the "Hall" probe are difficult to move rapidly and by their very nature have a relatively low resolution. Both the flexibility and the resolution of the Hall probe are vastly improved in transducers which make use of the property of certain photosensitive semi-conductors, such as crystalline germanium, when placed into a magnetic field and illuminated in a direction perpendicular to the magnetic field, to develop a voltage in a direction mutually perpendicular to both the magnetic field and the light, as described in my Patent No. 2,968,799, issued January 17, 1961. However, the voltage response of these last mentioned transducers is rather small and in any case much smaller than the output voltage supplied by a Hall probe.

It is an object of my invention to provide a magnetic transducer that combines high resolution with an adequately high voltage output.

Another object of my invention is to provide a magnetic transducer that is highly flexible and may readily be employed to scan rapidly large areas for magnetically stored information, and which has at the same time high resolution and generates an adequate response voltage.

More particularly it is an object of my invention to provide a magnetic transducer of the type employing a semi-conductor to produce a signal in response to magnetic fields, which has a high resolution and the same flexibility as transducers of the type utilizing the photosensitivity of semi-conductors, but produces a voltage response that is many times larger than the voltage response of said aforementioned transducer and compares favorably with the voltage response of the Hall probes.

Figure 2:
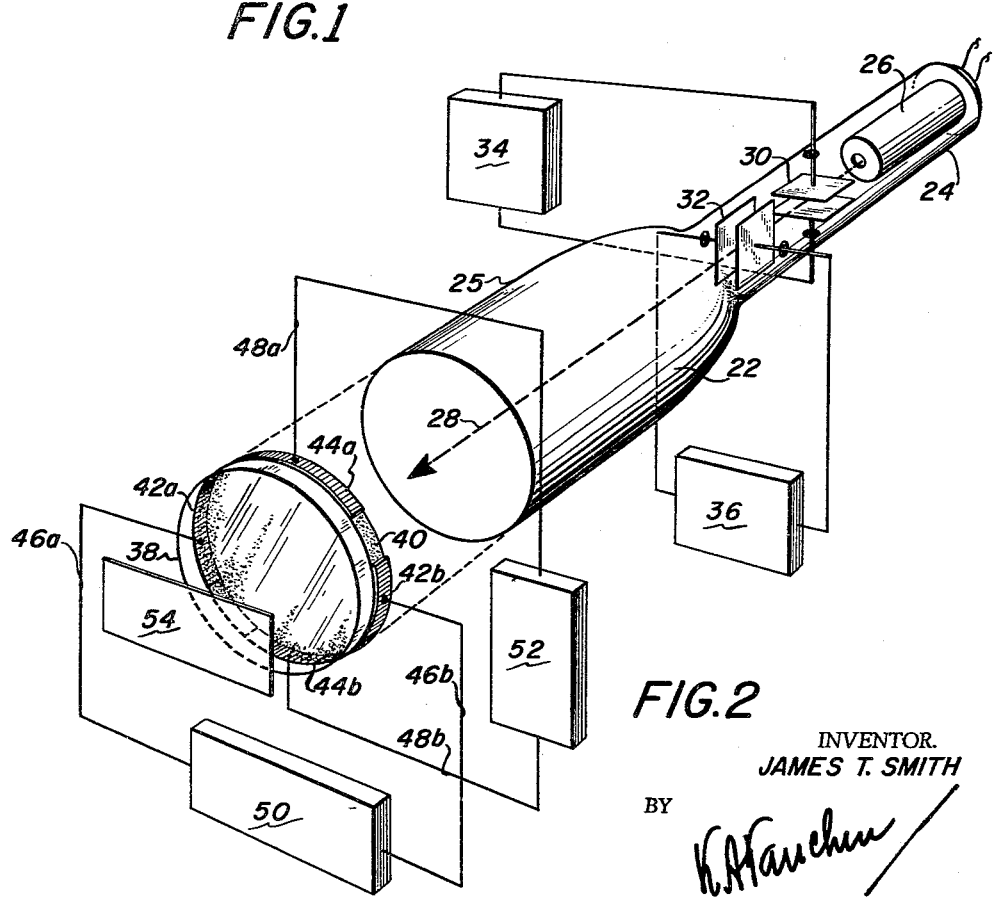
Figure 3:
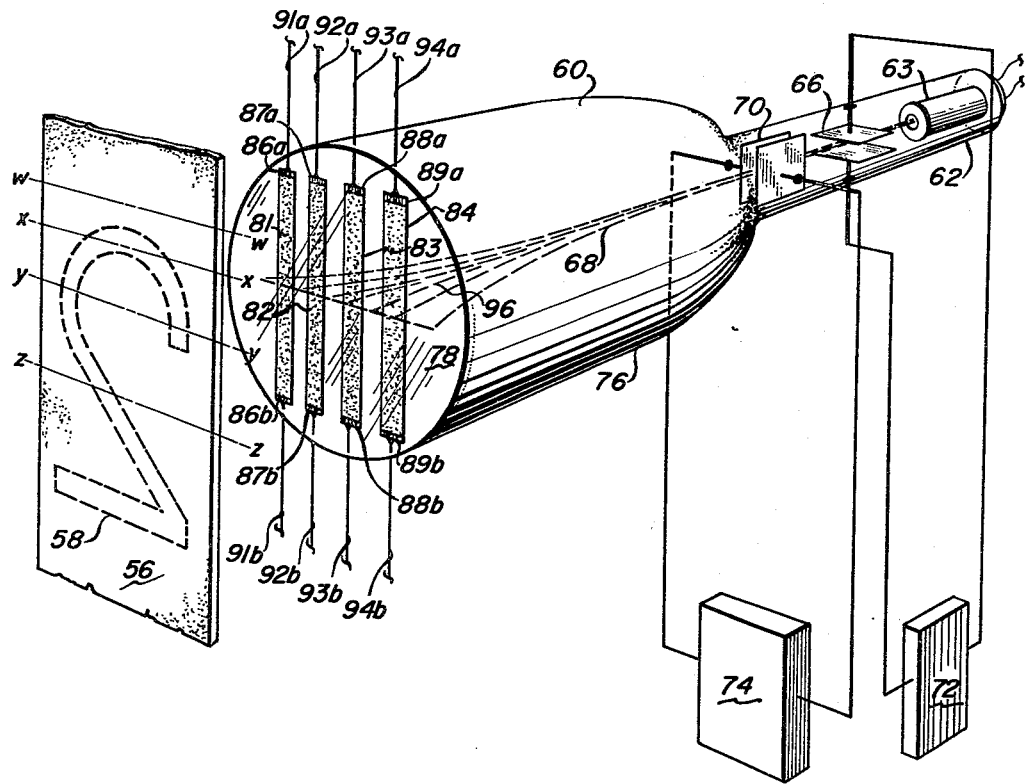

These and other objects of the present invention will be apparent from the following description of the accompanying drawing which illustrates certain preferred embodiments thereof and wherein, FIG. 1 is a perspective of certain components which illustrate diagrammatically the principles of my invention;

FIG. 2 is an exploded perspective of a magnetic transducing apparatus wherein the principles of my invention are embodied; and FIG. 3 is a perspective of a modified embodiment of the invention.

The present invention is based upon the discovery that when an electron beam is directed against a plate made of a crystalline semi-conductor at right angles thereto and the plate is passed through a magnetic field extending at right angles both to the electron beam and the plate, a surprisingly high voltage difference is developed between opposite points of said plate at either side of the point or points impinged upon by the electron beam. Said voltage is very markedly higher for the same intensity of the magnetic field than the voltage response obtained when the plate is illuminated by a light beam rather than an electron beam. Hence, by constructing a magnetic transducer wherein a plate or plates of semi-conductive material are irradiated with an electron beam, an instrument is obtained that represents a practically perfect answer to the requirements for an ideal transducer, namely a high response voltage, high flexibility and a high degree of resolution.

Having reference to FIG. 1, the reference numeral 10 designates a vertically placed plate of a polycrystalline semi-conductor, such as germanium, whose vertically disposed edges are provided with conductive side bars 12a and 12b to which are connected leads 14a and 14b. An electron gun 16 is located in front of the plate 10 in such a manner that its electron beam 18 impinges upon the front face of the plate at a point between the conductive side bars 12a and 12b. Said gun 16 may be arranged by well known means (not shown) to sweep its beam in a line from one side bar to the other, to return to a point adjacent said first mentioned side bar and sweep again in a straight line over to the other side bar. When a magnetic field extending at right angles both to the plate 10 and the electron beam 18 is encountered by, or passes through, the plate, as symbolized by the magnetic poles $20_n$ and $20_s$, the electrons directed against the plate 10 by the gun 16 and the electrons disassociated from positive holes by the electron bombardment of the plates are deflected in one direction and the positive holes are deflected in the opposite direction by the magnetic field and cause a very pronounced voltage difference to appear between the conductive side bars 12a and 12b, and when the magnetic field or fields encountered by the plate 10 emanate from the remanent magnetism established upon magnetizable areas to store information, the voltage variations developed between the side bars 12a and 12b in the described manner may be employed through the leads 14a and 14b to operate circuitry by means of which the stored information is reproduced in a useable form.

FIG. 2 illustrates a practical embodiment of my invention such as may be used to recover information that has been magnetically recorded on a card, tape or tape section of magnetizable material by magnetizing predetermined areas thereof or by de-magnetizing predetermined areas of said card, tape or tape section after it has first been magnetized in its entirety. The device comprises an evacuated envelope 22 of glass, which may have the configuration of an ordinary cathode ray tube in that it has a narrow portion 24 and a radially enlarged portion 25. Located in said narrow portion 24 is an electron gun 26, and in front of said gun at either side of the electron beam 28 emitted therefrom during operation of the device are pairs of deflection elements 30 and 32, to which may be applied the output of saw tooth generators 34 and 36, respectively, to cause the electron beam to scan the end wall 38 of the envelope both in a vertical and a horizontal direction. In FIG. 2 the end wall 38 of the envelope has been represented as a disk of exaggerated thickness for the purpose of clarity in illustration. In reality said end wall should be as thin as structurally possible without rendering the device unsafe to handle, and a very thin layer 40 of a crystalline semi-conductive material, such as polycrystalline germanium, indium, antimonide, or silicon is placed upon the inner surface of said wall, as likewise shown with exaggerated thickness in FIG. 2. As an alternative, the envelope 22 may be constructed to have an end wall in the form of a very thin disk that is made entirely of a crystalline semi-conductor and which is set into the wide end of the glass envelope and is sealed to the wall thereof in an air tight manner.

The layer 40 of semi-conductive material within the envelope 22 is encircled by angularly spaced ring segments of conductive material such as brass, which are indicated by the arcs 42a, 42b, 44a and 44b in FIG. 2, and secured to said ring segments at points defining a vertical and a horizontal diameter, respectively, are pairs of conductive leads 46a, 46b and 48a, 48b that extend through the wall of the envelope to the outside. The individual leads of each pair are connected to suitable control circuitry indicated by the blocks 50 and 52 for utilizing any voltage impulses that develop across the leads of each pair during practical performance of the device. Control circuitry of this type is well known in the art and does not by itself form a part of this invention.

In practical performance a tape, tape segment, disk, drum or card, such as shown at 54, upon which information has been magnetically stored, is held tightly against the end wall of the device and the device is set into operation by energizing the electron gun to emit a low energy beam and by activating the generators 34 and 36 to sweep the electron beam horizontally at successively lower levels across the layer 40 over the area defined by the contour of the card 54. The electrons impinging upon the layer or semi-conductive material cause a disassociaton of electrons and positive holes in the semi-conductor, and if they do not encounter a magnetic field, they diffuse uniformly in all directions so that no measurable voltage is developed across the conductive segments 42a and 42b or 44a and 44b. However, if the card 54 is magnetized or has magnetized areas, the magnetic fields emanating from said card and extending into the layer of semi-conductive material deflect the electrons and the positive holes that are disassociated by the electron beam, in opposite directions and cause a current flow of surprisingly high magnitude in a direction mutually at right angles to the direction of the magnetic field and the direction of the electron beam. As a result thereof substantial voltage impulses appear across the segments 42a and 42b or 44a and 44b depending upon the direction of travel of the beam 28, and these impulses may be applied to the signal utilizing circuitry 50 or 52 through the leads 46a, 46b or 48a, 48b, as the case may be.

Voltage impulses that are representative of information stored upon the card 54 may be derived from the described device irrespective of whether the card is of the type wherein the information is stored by magnetizing minute areas thereof or of the type wherein the total card is magnetized and information is stored therein by demagnetizing predetermined spots thereof. Such demagnetization may be accomplished with the aid of the Curie effect, by subjecting said spots to predetermined elevated temperatures which may be accomplished with an electron beam of higher power than the electron beam employed in accordance with my invention to recover the magnetically stored information.

As pointed out hereinbefore, the voltage output and the fluctuations in said voltage output obtained with the device of my invention, when the electron beam encounters magnetized areas or demagnetized areas, are surprisingly high and range from millivolts to volts. The resolution of the device is determined by the spot size of the electron beam which may be made of a size of the order of .0005" at the present state of the art. Hence, the resolution of the device is of a very high order. For reading the information stored magnetically upon a card of the type illustrated, the device of the invention requires no physical movement of either the card or the device itself. It is merely necessary to sweep the electron beam over the area determined by the card, which can readily be effected in a well known manner by applying the proper voltages to the deflection members 30 and 32. Hence, the flexibility of the device is excellent. The speed with which the recorded information can be recovered by the transducer of my invention is of a very high order; for instance, I have found that a measurable voltage develops between the leads 46a and 46b or 48a and 48b within less than a microsecond after the electron beam impinges upon an area of the semi-conductive layer that is traversed by a magnetic field.

FIG. 3 illustrates another embodiment of my invention that is specially adapted for sensing characters which have been printed with magnetic materials upon a recording surface or which have been recorded upon a magnetic surface by demagnetizing an area thereof which has the configuration of a character such as illustrated in FIG. 3. In said FIG. 3 the reference numeral 56 identifies a portion of tape provided with a magnetic coating and the reference numeral 58 identifies a demagnetized area on said card in the form of the character 2. The device of the invention illustrated in FIG. 3 is similar in construction to the one illustrated in FIG. 2 in that it comprises an evacuated envelope 60 which may be of glass and which has a narrow end portion 62, within which is located the electron gun 63, a pair of deflector elements 66 for deflecting the electron beam 68 in a vertical plane and a pair of deflector elements 70 for deflecting the electron beam in a horizontal plane, each provided with an appropriate voltage generator 72 and 74, respectively. The enlarged portion 76 of the envelope 60 is closed off by an end wall 78 that is made as thin as the evacuated state of the envelope will permit without rendering the device unsafe to handle. Secured to the inner surface of said disk are several vertically disposed narrow strips 81, 82, 83 and 84 of a crystalline semi-conductor, such as polycrystalline germanium. The narrow ends of said strips are provided with edges of conductive material, such as brass or copper, which are identified by the reference numerals 86a, 86b, 87a, 87b, 88a, 88b and 89a, 89b respectively, and connected to said edges and extending through the envelope 60 at opposite points thereof are lead wires 91a, 91b, 92a, 92b, 93a, 93b and 94a, 94b, respectively. Each pair of said lead wires is connected to circuitry (not shown) that utilizes the voltages and voltage changes developed between said leads to produce visible or audible signals or to supply data processing machinery.

In operation, the generator 74 of the deflector members 70 is arranged to maintain the electron beam continuously in a state wherein it is fanned out in a horizontal plane to an extent encompassing at all times all the four strips of semi-conductive material 81 to 84, as shown at 96 in FIG. 3, and the generator 72 of the deflecting members 66 is arranged to sweep the fanned out beam continually from the top to the bottom edges of said strips. When the tape 56 is placed against the end of the envelope, while the electron gun is in operation, and its fanned out beam 96 impinges upon the upper ends of the strips 81 to 84 above the highest point of the demagnetized area 58, as indicated by the line w—w in FIG. 3, the magnetic field set up by the area of tape 56 above the character 2 produces an equal voltage response in every one of the four pairs of leads 91a, 91b; 92a, 92b; 93a, 93b and 94a, 94b. When the beam has dropped to a level, wherein its plane intersects the upper end of the character 2 as indicated by the line x—x in FIG. 3, the voltage between the leads of the centrally located strips 82 and 83 decreases due to the fact that the area denoting the character 2 is demagnetized and does not produce a magnetic field. When the electron beam has reached the level marked y—y in FIG. 3, the voltage developed between the leads of the outer strips 81 and 84 will drop while the voltage developed between the leads of the inner strips 82 and 83 rises; and when the beam reaches the level indicated by the line z—z, the voltage developed between the leads of the first, third and fourth strips (as counted from the left in FIG. 3) is high while the voltage developed between the leads of the second strips 82 is low. In this manner the presence and the denomination of any character upon the tape may be sensed and the resulting voltage changes developed across the leads of the strips 81 to 84 may be employed to visibly identify the characters marked upon the tape.

The usefulness of the device illustrated in FIG. 3, however, is not limited to sensing characters represented by demagnetized areas in plain surfaces. The device may also be employed to recover simultaneously magnetic bits that have been serially recorded in several parallel rows.

The devices of my invention may be made of small dimensions, they are easy to handle, their resolution is excellent, their output voltage is high and their speed of operation is high. They therefore represent magnetic transducers of ideal performance characteristics.

While I have described my invention with the aid of certain preferred embodiments thereof, it will be understood that the invention is not limited to the specific constructional details shown and described, by way of example, which may be departed from without departing from the spirit and scope of my invention.

What is claimed is:

A magnetic transducer for recovering information recorded upon a card in the form of magnetic and nonmagnetic areas comprising an evacuated envelope having a flat end, said flat end having an outer surface adapted for contact with a recording card of the type defined and an inner surface bearing elongated transversely spaced strips of a crystalline semi-conductive material, an electron gun located within said envelope at the end thereof opposite to said flat end and operable to direct a beam of electrons against said flat end in a direction substantially perpendicular to the plane determined by said strips, means effective to spread said beam in a transverse plane so that its fanned-out end may encompass all said strips in a direction transversely thereof and operable to sweep said spread electron beam over said strips in a direction longitudinally thereof so as to produce individual voltage impulses across the opposite ends of each strip as the fanned-out electron beam encounters in said strips magnetic fields emanating from a recording card held against the outer surface of said flat end, and means including leads extending from the opposite ends of said strips through said envelope to the outside for utilizing the voltages developed across said strips.

References Cited in the file of this patent

UNITED STATES PATENTS

| | | |
|---|---|---|
| 2,589,704 | Kirkpatrick | Mar. 18, 1952 |
| 2,657,378 | Gray | Oct. 27, 1953 |
| 2,843,773 | Wardley | July 15, 1958 |
| 2,866,013 | Reis | Dec. 23, 1958 |
| 2,959,771 | Levin | Nov. 8, 1960 |

FOREIGN PATENTS

| | | |
|---|---|---|
| 1,129,267 | France | Sept. 3, 1956 |
| 770,127 | Great Britain | Mar. 13, 1957 |